F. M. ANSPACH AND F. L. MYERS.
DUST COLLECTOR.
APPLICATION FILED MAY 20, 1920.
1,380,698. Patented June 7, 1921.
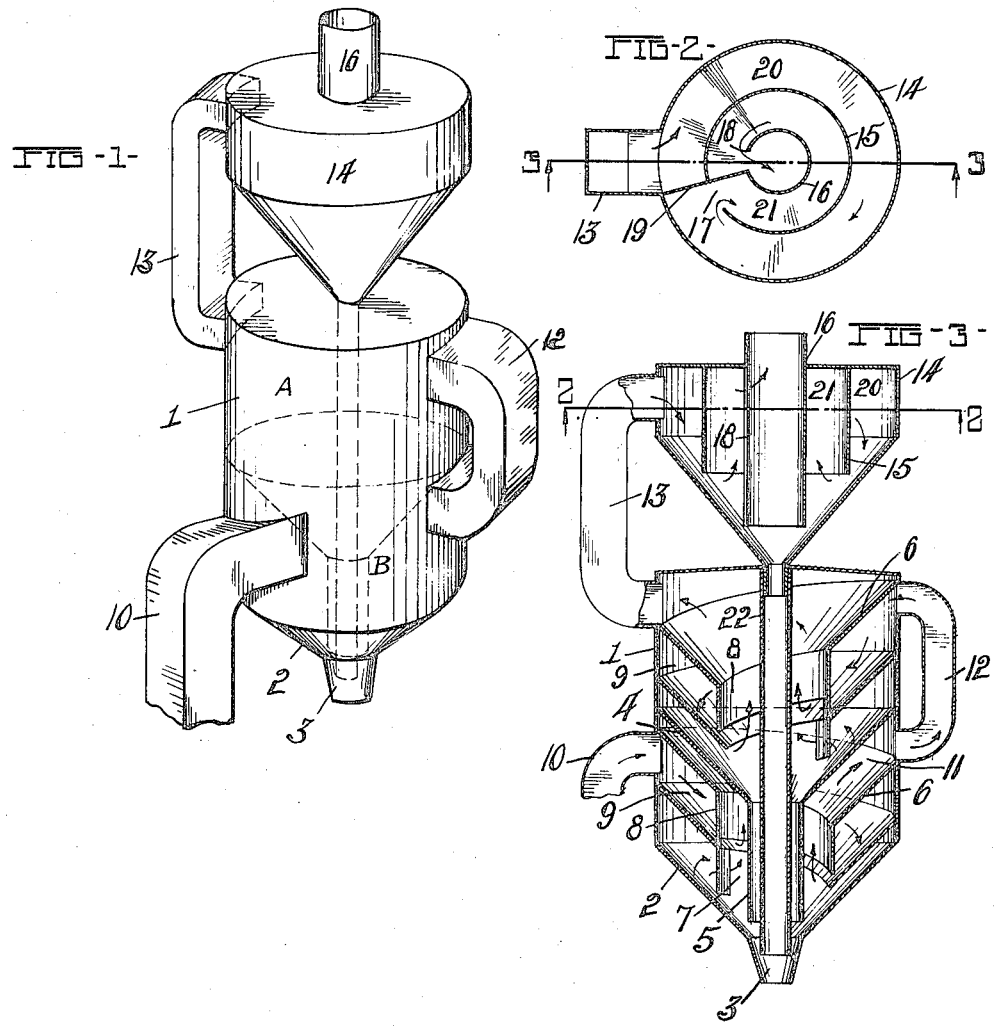
INVENTOR
Frank M. Anspach,
Frank L. Myers,
By Burn Burn & Crampton
Their attys

UNITED STATES PATENT OFFICE.

FRANK M. ANSPACH AND FRANK L. MYERS, OF TOLEDO, OHIO.

DUST-COLLECTOR.

1,380,698.　　　　　Specification of Letters Patent.　　Patented June 7, 1921.

Application filed May 20, 1920. Serial No. 382,747.

*To all whom it may concern:*

Be it known that we, FRANK M. ANSPACH and FRANK L. MYERS, citizens of the United States, and residents of Toledo, in the county of Lucas and State of Ohio, have made an Invention Appertaining to Dust-Collectors; and we do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to dust collectors, and has for its object the provision of an improved simple and highly efficient device of this character.

The invention is fully described in the following specification, and while, in its broader aspect, it is capable of embodiment in numerous forms, a preferred embodiment thereof is illustrated in the accompanying drawings, in which,—

Figure 1 is a perspective elevation of a dust collector embodying the invention. Fig. 2 is a horizontal section on the line 2—2 in Fig. 3, and Fig. 3 is a vertical section on the line 3—3 in Fig. 2 with parts in full.

Referring to the drawings, 1 designates an upright cylindrical casing having an outwardly flaring conical bottom 2 with an outlet 3 for dust and dirt in its apex portion. The casing may be provided interiorly thereof with one or more dust collecting or gravitating sections, disposed one above the other. The present embodiment of the invention is provided with two of these sections, the lower being designated A and the upper B. These sections are separated by a partition 4 of downwardly projecting conical form similar to the bottom 2 and having a dust discharge tube 5 extending downward from its apex portion to a point adjacent to the outlet 3 and spaced from the bottom 2.

Each section A, B comprises a flange 6 projecting inward and downward on an incline from the casing 1 and extending in spiral form around the interior of the case. The flange, which may be referred to as of conical spiral form, terminates in spaced relation to the discharge tube 5, which it surrounds, so as to provide a vertical passage 7 around said tube. A skirt flange 8 depends from the inner edge of the flange 6 to form the wall of the passage 7, but is slightly spaced at its lower edge from the subjacent convolution of the flange 6, or the bottom 2, as the case may be, to permit particles of dust and dirt, which gravitate down the inclined flange, to enter the passage 7 and pass downward therethrough to the outlet 3. The skirt flange 8, which is of spiral form to follow the spiral passageway 9, which is formed within the casing by the casing wall and flanges 6 and 8, opens at its lower end into the central passage 7. An inlet conduit 10 for dust laden air opens into the upper end of the spiral passageway 9 through the side of the casing.

The central passage 7 opens at its upper end into a space 11 between the upper convolution of the spiral flange 6 and the partition member 4, and this space has an outlet passage at one side of the casing in communication with a conduit 12. This conduit enters the section B of the dust collector in communication with the upper end of the spiral passageway 9 thereof in the same manner that the inlet conduit 10 opens into the passageway 9 of the lower section.

The space 11 of the upper section communicates at one side of the casing with an outlet conduit 13, which extends up and opens into the side of a final dust collecting device 14. This device is of shallow cylindrical form with its top, in the present instance, flat, and its bottom of downwardly projecting conical form. The interior of the device is provided with two tubular flanges 15 and 16, which depend from its top and have openings 17 and 18, respectively, in the sides thereof. A radial flange or partition 19 extends inward from the outer casing wall of the device 14 at a side of the inlet conduit through the opening 17 in contact with one edge wall thereof and to the flange 16 in contact with the opposite edge wall of its opening. It is thus evident that the air entering the device 14 is required to pass in one direction around the passageway 20 formed by the casing wall and the flange 15, thence through the opening 17 into and in the opposite direction around the passageway 21 formed by the flanges 15 and 16, thence through the opening 18 into the central passageway formed by the flange 16 and thence from the open top thereof to the atmosphere. Any dust carried into the chamber 14 by the air and gravitating to the bottom of the chamber will slide down the conical bottom wall thereof and pass through a discharge tube 22. This tube extends down through the center of the casing 1, the passage 7 of the upper section B and the tube 5 within the lower section and terminates in discharging relation to the bottom outlet 3 in spaced relation to its wall.

It is evident in the operation of the dust collector that the dust laden air entering the section A from the supply pipe 10 is caused to travel downward in said section through the downwardly extending spiral passageway 9 with the velocity of the air and the conical form of the spiral casing causing the air to seek the outside of the passageway by centrifugal action. The dust and dirt which gravitate from the air slide down the inclined flange 6 and bottom 2 to the central passage 7 and thence to a suitable point of deposit through the bottom outlet 3. The air after reaching the bottom of the spiral passageway 9 enters the lower end of the central passageway 7 passing upward therethrough to the space 11 and thence through the conduit 12 into the spiral passageway 9 of the upper compartment B, taking the same course through the upper compartment as it did through the lower. The dust and dirt which gravitate in this compartment pass downward through the outlet tube 5 to the outlet passage 3. As the air after leaving the casing 1 which may contain any number of dust collecting devices, may still contain some dust, the outlet 13 from the upper dust collection section is directed into a final dust collecting device 14 where the air takes a circuitous course and is baffled more or less in its course by the partitions 15, 16 and 19 before reaching the center outlet passage. The dust, which gravitates within this device passes down the conical bottom thereof and thence through the tube 22 to the bottom outlet 3.

We wish it understood that this invention is not restricted to any specific construction, arrangement or form of the parts, as it may be modified in numerous respects without departing from the spirit of the claims.

Having thus described our invention, what we claim as new, and desire to secure by Letters Patent, is,—

1. In a dust collector, a casing having an outlet at its top and a conical bottom with an outlet at its center, a conical spiral flange extending around within the interior of the casing and forming a central vertical passageway and coöperating with the casing to form a spiral passageway with an inlet at its upper end and an outlet at its lower end into the central passageway, each convolution of the spiral passageway having restricted communication at its inner bottom edge with the vertical passageway for the escape therein of some air and the heavier particles of dust from the spiral passageway, the vertical passageway communicating at its bottom with the bottom outlet and at its top with the top outlet whereby particles of dust pass downward through the central passageway and bottom outlet and the air current passes upward through the central passageway and through the top outlet.

2. In a dust collector, a cylindrical casing divided into vertically spaced compartments with the bottom of each compartment of downwardly protuberant conical form and each provided with a central outlet with the outlet of the upper compartment extended in tubular form down to adjacent the outlet of the bottom compartment, a conical spiral flange disposed within each compartment and forming a central vertical passage with the passage in the lower compartment surrounding the outlet tube of the upper compartment, said flange coöperating with the casing to form a spiral passageway which opens at the lower inner edge of each convolution and at its lower end into the central passage, an inlet conduit in communication with the upper end of the spiral passageway in the lower compartment, a conduit opening communication between the upper end of the central passageway in the lower compartment and the upper end of the spiral passageway in the next compartment, the center passageway of said next compartment having an outlet at its top.

3. In a dust collector, a plurality of superposed compartments each having a downwardly projecting conical bottom with a dust outlet at its center, a tube projecting from the bottom outlet of the bottom compartment, means in each compartment forming a spiral passageway and a central passageway with the inlet of the spiral passageway at its upper end and with its outlet opening into the central passageway and with the outlet of each central passageway in communication with the inlet end of the spiral passageway of the next superposed compartment, the bottom tubes extending down through the central passageways of the subjacent compartments.

4. In a dust collector, a casing forming a cylindrical chamber having a downwardly projecting conical bottom with a central outlet, a plurality of tubular flanges projecting down into the casing from its top and terminating in spaced relation to its bottom, the casing having an inlet opening in its side, each flange having an opening in its side and the passageway of the inner flange having an outlet opening at its top, a partition extending from the casing wall at one side of the inlet opening through the opening of the outer flange in contact with one edge wall thereof and to the opening of the inner flange in contact with the opposite edge wall thereof whereby air entering the casing is required to take a circuitous passage in first one direction and then another to find an exit through the center outlet opening at the top of the casing.

In testimony whereof we have hereunto signed our names to this specification.

FRANK M. ANSPACH.
FRANK L. MYERS.